(12) United States Patent
Covizzi et al.

(10) Patent No.: US 10,350,626 B2
(45) Date of Patent: Jul. 16, 2019

(54) PAINTING BOOTHS WITH AUTOMATIC FILTER SYSTEMS

(71) Applicant: GEICO S.p.A., Cinisello Balsamo (IT)

(72) Inventors: Giampaolo Covizzi, Cinisello Balsamo (IT); Paolo Colombaroli, Cinisello Balsamo (IT)

(73) Assignee: GEICO S.P.A. (IT)

( * ) Notice: Subject to any disclaimer, the term of this patent is extended or adjusted under 35 U.S.C. 154(b) by 0 days.

(21) Appl. No.: 15/754,007

(22) PCT Filed: Sep. 1, 2016

(86) PCT No.: PCT/IB2016/055225
§ 371 (c)(1),
(2) Date: Feb. 21, 2018

(87) PCT Pub. No.: WO2017/037643
PCT Pub. Date: Mar. 9, 2017

(65) Prior Publication Data
US 2018/0243778 A1    Aug. 30, 2018

Related U.S. Application Data

(63) Continuation of application No. PCT/IB2016/055225, filed on Sep. 1, 2016.

(30) Foreign Application Priority Data

Sep. 1, 2015 (IT) ........................ 102015000047669

(51) Int. Cl.
*B05B 14/43*    (2018.01)
*B01D 46/00*    (2006.01)
*B05B 16/00*    (2018.01)

(52) U.S. Cl.
CPC .......... *B05B 14/43* (2018.02); *B01D 46/0006* (2013.01); *B01D 46/0002* (2013.01); *B05B 16/90* (2018.02)

(58) Field of Classification Search
None
See application file for complete search history.

(56) References Cited

U.S. PATENT DOCUMENTS 5,039,313 A * 8/1991 Gocht ........................ B03C 3/16
                                                                 95/65
5,487,766 A * 1/1996 Vannier .............. B01D 46/0005
                                                                 454/64
(Continued)

FOREIGN PATENT DOCUMENTS

DE     202014103177 U1    8/2014

OTHER PUBLICATIONS

International Search Report and Written Opinion dated Nov. 15, 2016, in PCT Application No. PCT/IB2016/055225, 7 pages.
(Continued)

*Primary Examiner* — Jethro M. Pence
(74) *Attorney, Agent, or Firm* — MH2 Technology Law Group LLP

(57) ABSTRACT

A paint-spraying booth may include: a paint-spraying chamber; at least one filter unit; and/or an automated system. Paint is sprayed in the paint-spraying chamber. The paint-spraying chamber may be provided with air flow for evacuation of paint overspray which may be conveyed to the at least one filter unit of the paint-spraying booth for filtering and separation of the paint overspray from the air flow. The at least one filter unit may include a plurality of replaceable filter modules. Each filter module may be removably contained inside a housing in the at least one filter unit. The automated system may be configured to remove and transport each filter module between a housing of the at least one
(Continued)

filter unit and a zone for entry/exit of the filter modules into/from the paint-spraying booth.

18 Claims, 3 Drawing Sheets

(56) References Cited

U.S. PATENT DOCUMENTS 5,591,240 A * 1/1997 Ophardt ............. B01D 46/0058
  96/407
2016/0288036 A1  10/2016 Wieland et al.

OTHER PUBLICATIONS

International Search Report and Written Opinion dated Nov. 15, 2016, in PCT Application No. PCT/IB2016/055226, 8 pages.

* cited by examiner

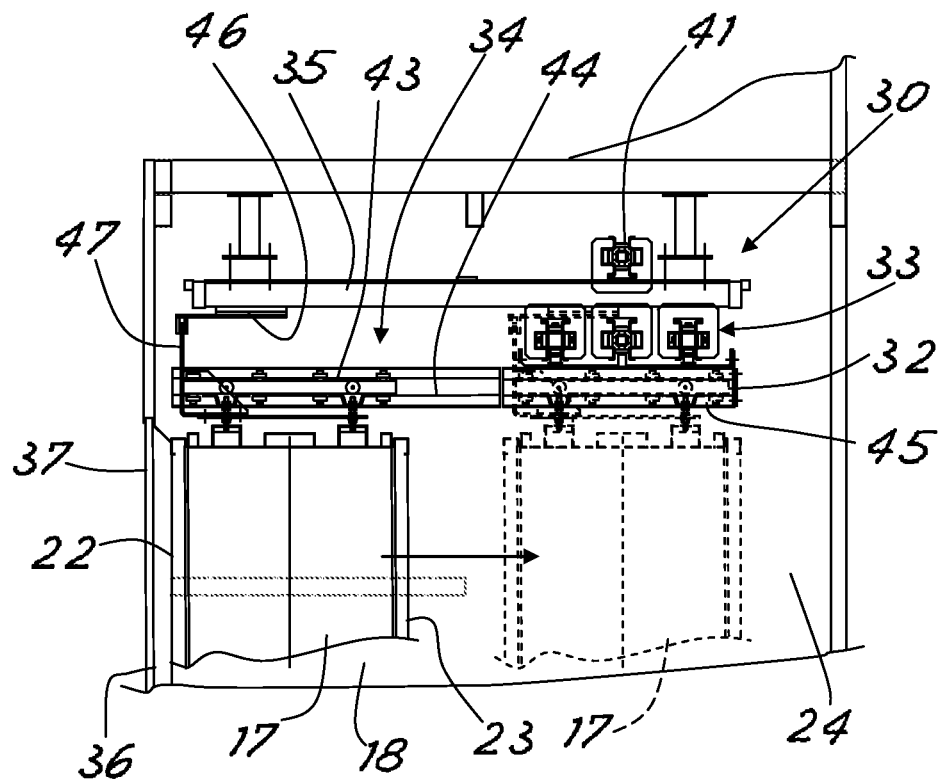
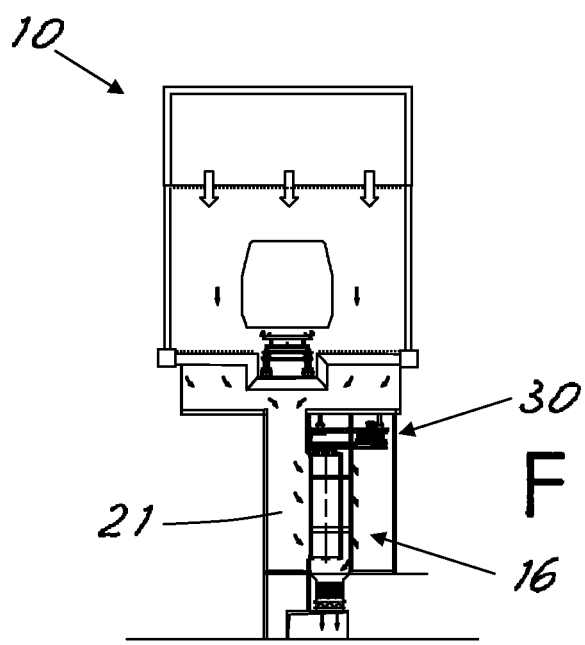
Fig.3
Fig.4

PAINTING BOOTHS WITH AUTOMATIC FILTER SYSTEMS

CROSS-REFERENCE TO RELATED APPLICATION(S)

This application is a national stage entry from International Application No. PCT/IB2016/055225, filed on Sep. 1, 2016, in the Receiving Office ("RO/IB") of the World Intellectual Property Organization ("WIPO"), published as International Publication No. WO 2017/037643 A1 on Mar. 9, 2017, and claims priority under 35 U.S.C. § 119 from Italian Patent Application No. 102015000047669, filed on Sep. 1, 2015, in the Italian Patent and Trademark Office, the entire contents of all of which are incorporated herein by reference.

The present invention relates to a paint-spraying booth provided with an automated system for changing the filters for eliminating the overspray.

Usually the paint-spraying booths are provided with an air flow which passes through the working zone so as to convey the overspray, namely the nebulized excess paint, outside of the booth. The air drawn in with the overspray must be necessarily purified of the paint before it can be released into the environment or reintroduced into the booth and for this reason the air flow is made to pass through suitable filtering systems.

The systems which use filters become clogged as they get filled with paint and must be regularly replaced. This often results in the booth being non-operative for a considerable period of time. Moreover, the filter changing operations may be complex and difficult for the maintenance personnel who are often obliged to work in "contaminated" zones.

The general object of the present invention is to provide a booth with a filtering system having means for automated replacement of the overspray elimination filters.

In view of this object, the idea which has occurred, according to invention, is to provide a paint-spraying booth comprising a paint-spraying chamber in which the paint is sprayed and which is provided with an air flow for evacuation of the overspray which is conveyed to at least one filter unit of the booth for filtering and separation of the paint overspray from the air flow, the filter unit comprising a plurality of replaceable filter modules, each filter module being removably contained inside a housing in the filter unit, characterized in that it comprises an automated system for removing and transporting each filter module of the plurality between its housing and a zone for entry/exit of the filter modules into/from the booth.

In order to illustrate more clearly the innovative principles of the present invention and its advantages compared to the prior art, an example of embodiment applying these principles will be described below with the aid of the accompanying drawings. In the drawings:

FIG. 3 shows an enlarged, partial, schematic view of an automated system for transporting the filters into the booth according to the invention;

FIG. 4 shows a schematic view similar to that of FIG. 1 and showing a possible variation of embodiment of a booth according to the invention.

Figure 1:
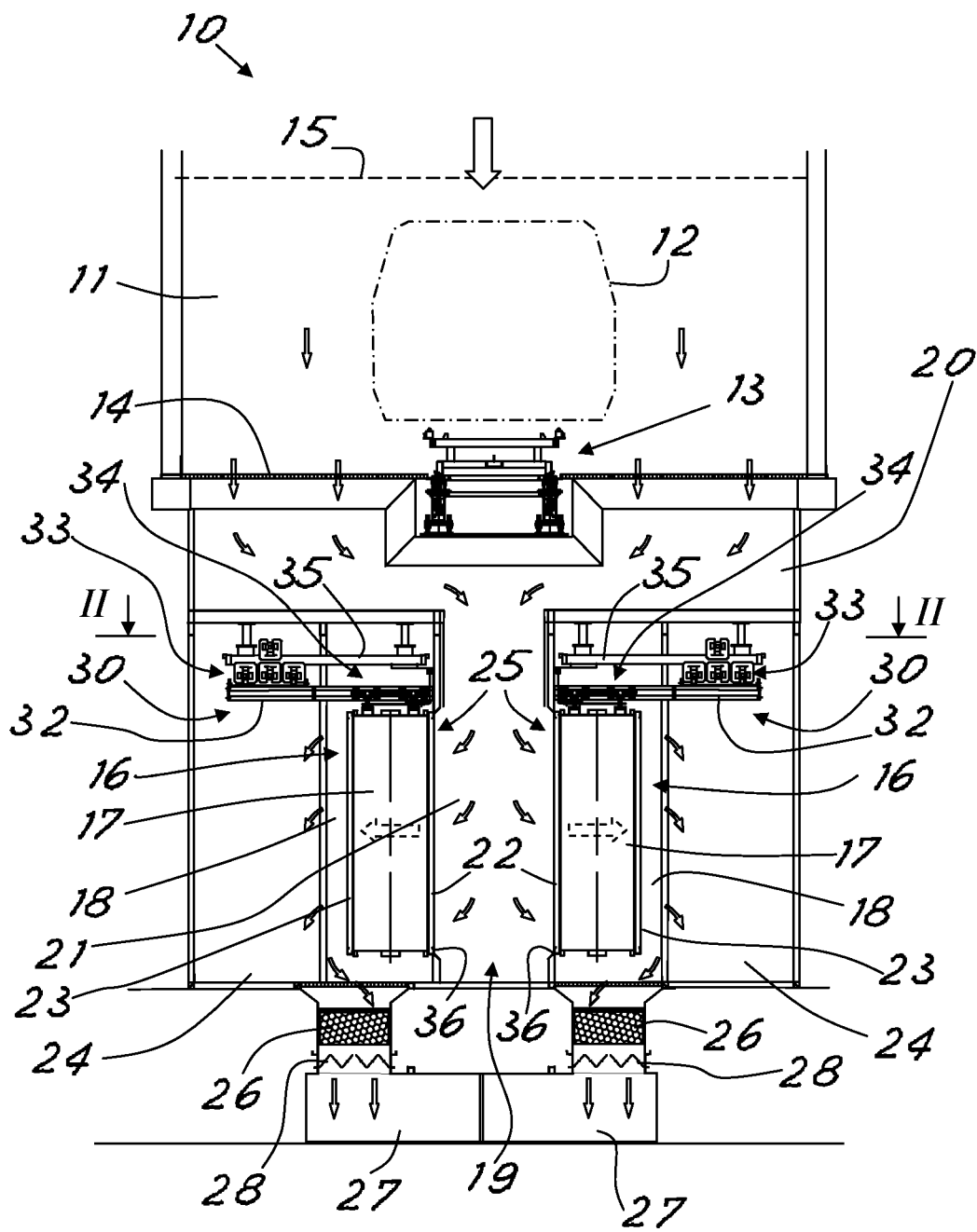
FIG. 1 shows a partially sectioned schematic elevation view of a booth according to the invention.

With reference to the figures, FIG. 1 shows a paint-spraying booth according to the invention, denoted generally by 10.

The booth comprises a chamber 11 for spraying objects 12 (for example motor vehicle bodies). The objects to be sprayed are advantageously transported into the chamber 11 by means of a known sequential conveyor system 13.

The chamber 11 is provided with known paint-spraying devices (not shown) which are operated so as to spray the paint onto the surfaces of the object to be painted. Advantageously, the paint-spraying devices may be realized in the form of known robot arms provided with spray guns.

Air for removal of the overspray from the chamber 11 is circulated inside the booth. For example, suitable air circulation fans (not shown) are advantageously provided according to a technique known per se for producing a continuous flow of air through the chamber.

Advantageously, for circulation of the air flow, the floor 14 of the chamber 11 is composed of grilles through which the chamber air is drawn. The ceiling of the chamber is therefore provided with corresponding air inlets 15 so as to have a continuous air flow which passes vertically through the chamber from the top downwards during the paint-spraying operations. The air flow leaving the chamber 11 is conveyed to at least one filter unit 16 which retains the overspray. The filter unit comprises advantageously a plurality of replaceable filter modules 17, each accommodated inside an associated housing 18 which forms a seat for the filter module and which connects it between the inlet for the air from the chamber and the outlet for discharging the air after filtering.

In particular, advantageously a first passage 21 for entry of the air into the filters and a second passage 24 where the air exits from the filters are provided, with the filter modules of the filter unit being connected in parallel between the entry and exit passages.

In the embodiment shown in FIG. 1, the filter units are advantageously two in number, being arranged facing each other in a mirror-image layout relative to a vertical mid-plane of the booth. Advantageously this plane is parallel to the direction of movement of the transportation system 13 which defines the direction of longitudinal extension of the booth.

In the booth embodiment where the air is drawn through the floor 14, the filter unit or units 16 are preferably arranged directly underneath the floor 14.

In the embodiment shown there is advantageously a chamber 19 having a cross-section generally in the form of a T for defining an upper header 20 extending horizontally underneath the floor 14 for receiving air therefrom and with the vertical part of the T which forms the passage 21 extending along the filter modules for allowing entry of the air into the filters. Inside the passage 21 the inlets 22 of the filter modules present in the respective housings 18 are arranged alongside each other.

The outlets 23 of the filter modules in the respective housings 18 communicate in turn with the passage 24 for evacuation of the filtered air flow. In the embodiment shown, the filter modules have advantageously a parallelepiped form with inlet and outlet arranged on opposite sides and connected in parallel between the inlet passage 21 and the outlet passage 24. The filters may be of various suitable types, for example also of the disposable type made of cardboard.

The passage 24 is advantageously connected (preferably via one or more further filters 26, for example of the "pocket" type) to a duct 27 for evacuating the air from the booth. The duct 27 may definitively evacuate the air externally and/or convey it back into the chamber 11 for recycling of purified air.

Again advantageously, controlled gates 28 may be provided for throttling and/or closing the air flow leaving the filter modules. These gates (as well as the optional further filters 26) may be provided one for each filter module 17 or may be provided for several filter modules 17. In FIG. 1, the air flow into the booth is indicated schematically by means of the arrows.

Figure 2:
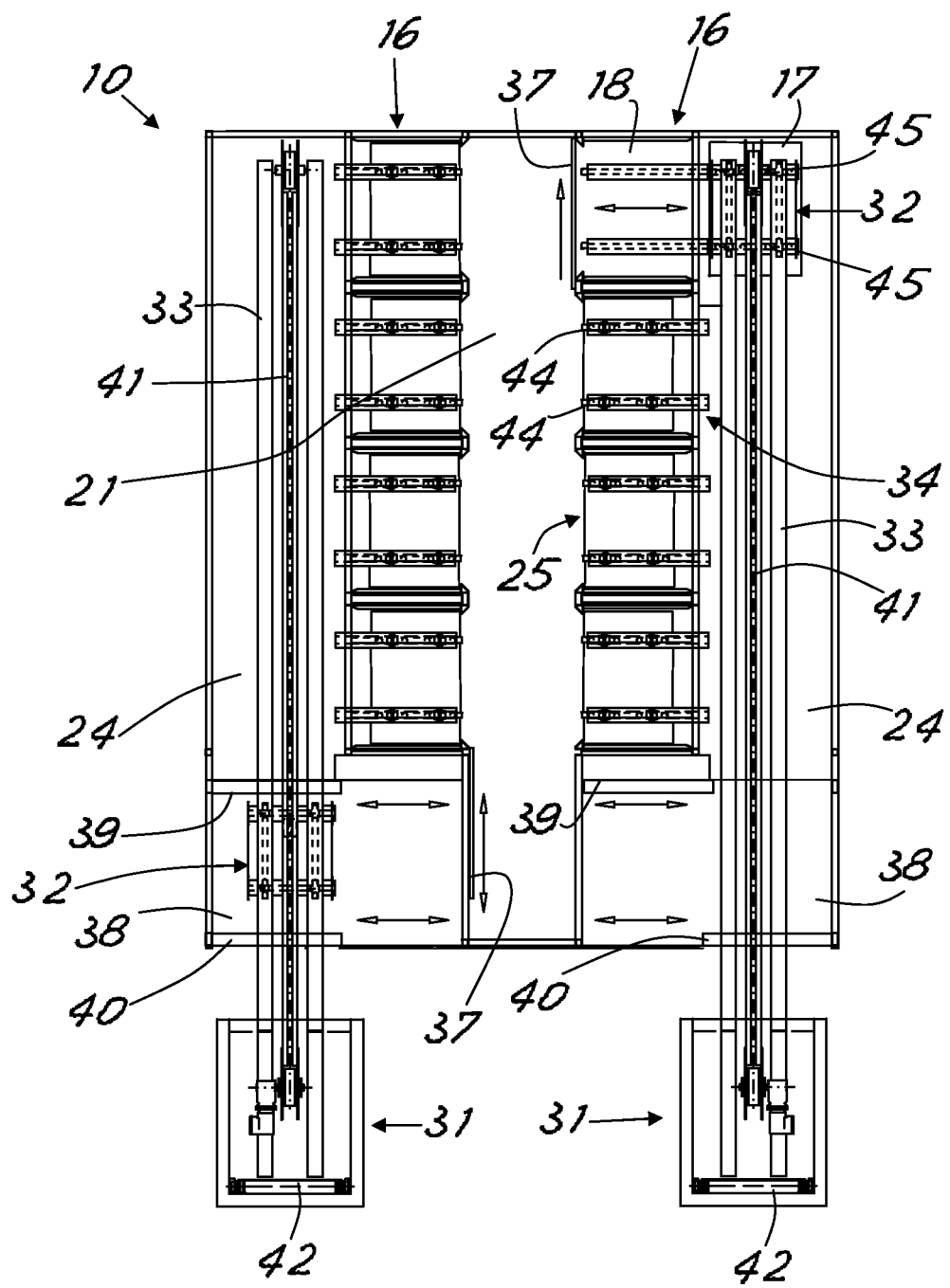
FIG. 2 shows a schematic plan view of the booth sectioned along the line II-II of FIG. 1.

As can be clearly seen also in FIG. 2, the booth according to the invention comprises at least one automated system 30 for removing and transporting each filter module 17 of the plurality between its housing 18 and a zone 31 for entry/exit of the filter modules into/from the booth, for removing a filter module from its housing and transporting it into the entry/exit zone and for removing a filter module from the entry/exit zone and transporting it into an empty housing 18.

The automated system comprises advantageously means which are movable sequentially between the plurality of housings 18 of the filter modules 17 and the zone 31 for entry/exit of the filter modules into/from the booth. Preferably, as can be clearly seen in the figures, these means may comprise a shuttle 32 which travels hung from the rails 33 which extend along the corridor 24 so as to pass sequentially in front of the housings 18 of the filter modules. The shuttle may be moved by means of a motorized-chain system 41.

Further transfer means 34 may be provided for transferring each module between its housing and the shuttle. In particular, as can be clearly seen in FIG. 3, these means 34 may comprise for each module a carriage 43 from which the module is hung and which may be transferred on the shuttle 32 by means of a suitable actuator or transfer device 35, thus extracting the filter module from its housing and transferring it inside the passage 24.

Once the shuttle has loaded the filter module it may be displaced towards the entry/exit zone 31 where the used filter is unloaded from the shuttle and removed from the booth. Similarly, a new filter may be loaded onto the shuttle in the entry/exit zone 31 and transported and inserted into an empty housing 18, with a procedure which is the reverse of that described above for extraction.

The modules may also be moved from and to the entry/exit zone for example by means of a suitable known elevator 42 which picks them up from a store or from a manual loading/unloading zone. Advantageously, in the case of compatible filters, for example made of cardboard, the entry/exit zone may also comprise a suitable compactor device, of the type known per se.

The filter modules have advantageously the inlet side which sealingly adheres with its edge against a circumferential edge 36 of the communication opening 25 between housing 18 and entry passage 21. In this way, it is sufficient to rest the filter against the edge 36 in order to ensure the air tightness and the circulation through the filter of the air flow from the paint-spraying chamber. The sealing contact may be for example ensured by the actuator or transfer device 35 which pushes the filter module inside its housing. Further known automated constraining means may be provided for keeping the module in the operative position.

Means are also provided for closing the opening 25 for entry of the air into the filter modules. Advantageously, in order to realize these means, the entry passage 21 is provided with a movable partition 37 which is motorized (using means known per se and therefore not shown, for example, a chain drive system) so as to travel along the passage and close in sequence one of the openings for entry into the filter modules. In this way, when it is required to replace a filter module, the partition is displaced so as to close the entrance to this module and the module is then extracted from the housing and transferred onto the shuttle which transports it to the exit zone. Once a new filter module has been introduced into the housing, the partition 37 may return to the rest position (shown in FIG. 2 for the left-hand unit).

In order to allow entry and exit of the filter modules into/from the passage 24 without having to interrupt completely the circulation of the air, advantageously a transfer chamber 38 provided with a first door 39 communicating with the passage 24 and a second door 40 communicating with the outside, and in particular the entry/exit zone 31, are provided. In this way, by opening the two doors in an alternating manner using a suitable drive system (not shown), it is possible to transfer the filter modules without the passage 24 communicating with the exterior. The transfer chamber 38 may also be used to house the shuttle 32 when not in use, closing both the doors 39 and 40 so as to keep it isolated from the air flow present inside the passage 24.

FIG. 3 shows in greater detail a possible advantageous embodiment of the system 30 for transportation and replacement of the filters.

In particular, each filter module 17 is hung from an associated carriage 43 which is displaceable along rails 44 arranged on the ceiling of each housing 18 and extending in the direction of extraction/insertion of the module from/into the housing. Advantageously, this direction is transverse to the direction of displacement of the shuttle 32 on its rails 33.

The shuttle 32 comprises in turn rail sections 45 which are aligned with the rails 44 of a housing when the shuttle 32 is transported into the vicinity of this housing 18. In this way the actuator 35 may displace the filter unit with the carriage 43 from the rails 44 to the rail sections 45, and vice versa. As can be seen again in FIG. 3, the actuator 35 may be a known linear actuator provided with a motorized slider 46 which engages a suitable operating end 47 of the carriage 43 so as to controllably displace it between the housing 18 and the shuttle 32. Other transfer devices may be imagined by the persons skilled in the art.

Each filter unit comprises advantageously an associated movement system in a mirror-image arrangement relative to the other one.

Although the embodiment with two filter units in a mirror-image arrangement has been found to be particularly advantageous it is nevertheless also possible to use a single filter unit for example when the air flow to be treated is more limited. This is shown for example in FIG. 4 where essentially the T-shaped chamber for conveying the air to the filters has filter modules on one side only of the entry passage and therefore is provided with a single filter transportation system. As regards the rest the structure of the paint-spraying booth may be identical to that described above.

At this point it is clear how the predefined objects have been achieved. With a booth according to the invention it is possible to replace the filters cyclically in an automatic manner without having to stop the plant. Since the air flow is divided up by means of the plurality of filters, closing of one filter for removal and replacement thereof does not reduce excessively the air flow during the time needed for the whole operation.

Obviously the description above of an embodiment applying the innovative principles of the present invention is provided by way of example of these innovative principles and must therefore not be regarded as limiting the scope of the rights claimed herein.

For example, as may be now easily imagined by the person skilled in the art, the entry/exit zone may be divided into an entry zone where the new filters arrive and an exit zone where the used filters are transferred.

Changing of the filters may be performed by means of a manual change command entered by the operator or by means of a cyclical procedure whereby a filter is changed after a certain operating time. Suitable sensors may be provided, these requesting automatic changing of a filter when it is detected that it is clogged up by more than a certain amount. During a complete changing operation, the filter modules may also be sequentially replaced one at a time (or in pairs, in the case of two filter units with associated independent automated systems), until all the filter modules have been completely replaced, without stopping the plant.

In the case of disposable filters made of combustible material a method for high-temperature incineration of the used filters may be envisaged, said method using at least partly as fuel the filter itself and the paint contained in it. In addition to eliminating the filters it is possible to make advantageous use of the combustion for heat recovery from the combustion fumes.

The invention claimed is:

1. A paint-spraying booth, comprising:
a paint-spraying chamber;
at least one filter unit; and
an automated system;
wherein paint is sprayed in the paint-spraying chamber,
wherein the paint-spraying chamber is provided with air flow for evacuation of paint overspray which is conveyed to the at least one filter unit of the paint-spraying booth for filtering and separating the paint overspray from the air flow,
wherein the at least one filter unit comprises a plurality of replaceable filter modules,
wherein each of the filter modules is removably contained inside one of a plurality of housings of the at least one filter unit,
wherein the automated system is configured to remove and transport each of the filter modules between the one of the plurality of housings of the at least one filter unit and a zone for entry/exit of the filter modules into/from the paint-spraying booth,
wherein the automated system comprises:
a motorized shuttle;
at least one transfer module device; and
a rail system extending along the plurality of housings;
wherein the motorized shuttle is configured to move on the rail system along the plurality of housings,
wherein the at least one transfer module device is configured to move between the motorized shuttle, in front of the one of the plurality of housings, and the one of the plurality of housings, and
wherein the at least one transfer module device, the motorized shuttle, and/or the at least one transfer module device and the motorized shuttle are configured to support the weight of a first filter module of the filter modules in order to controllably load/unload the first filter module into/from the one of the plurality of housings and to move the first filter module from/to the zone for entry/exit of the filter modules.

2. The booth of claim 1, wherein the at least one transfer module device comprise a carriage from which the first filter module is hung and which is displaced on first rails inside the one of the plurality of housings of the at least one filter unit using an actuator or transfer device.

3. The booth of claim 2, wherein the motorized shuttle comprises second rails for accommodating the carriage, and wherein the second rails for accommodating the carriage are aligned with the first rails inside the one of the plurality of housings of the at least one filter unit.

4. The booth of claim 1, further comprising:
a first passage for entry of the air flow from the paint-spraying chamber into the filter modules and a second passage for exit of the air flow from the filter modules;
wherein the plurality of housings are arranged between the first and second passages so as to connect the filter modules of the at least one filter unit in parallel with each other.

5. The booth of claim 1, further comprising:
a first passage for entry of the air flow from the paint-spraying chamber into the filter modules and a second passage for exit of the air flow from the filter modules;
wherein the plurality of housings are arranged between the first and second passages so as to connect the filter modules of the at least one filter unit in parallel with each other, and
wherein the motorized shuttle travels inside the second passage.

6. The booth of claim 1, further comprising:
a movable partition that is configured to travel in sequence along air inlets of the filter modules so as to controllably close air inlets in the plurality of housings.

7. The booth of claim 1, further comprising:
a transfer chamber for transfer of the filter modules between the plurality of housings of the at least one filter unit and the zone for entry/exit of the filter modules;
wherein the transfer chamber is provided with a first door, communicating with the housings of the at least one filter unit, and a second door, communicating with an outside of the paint-spraying booth toward the zone for entry/exit of the filter modules.

8. The booth of claim 1, wherein the at least one filter unit comprises two filter units, and
wherein the filter units are arranged in a mirror-image layout underneath a floor of the paint-spraying chamber.

9. The booth of claim 1, wherein a chamber with a T-shaped cross-section is provided underneath a floor of the paint-spraying chamber,
wherein a horizontal part of the T-shaped cross-section is configured to form a duct for conveying the air flow which passes through the floor of the paint-spraying chamber, and
wherein a vertical part of the T-shaped cross-section is configured to form a duct, inside which inlets of the filter modules emerge.

10. The booth of claim 1, wherein further filters, controlled gates, or further filters and controlled gates for closing or throttling air flow exiting the filter modules are present downstream of the filter modules.

11. The booth of claim 1, further comprising:
a first passage for entry of the air flow from the paint-spraying chamber into the filter modules and a second passage for exit of the air flow from the filter modules;
wherein the plurality of housings are arranged between the first and second passages.

12. The booth of claim 1, further comprising:
a transfer chamber for transfer of the filter modules between the plurality of housings of the at least one filter unit and the zone for entry/exit of the filter modules.

13. The booth of claim 1, wherein the at least one filter unit comprises a single filter unit.

14. The booth of claim 1, wherein the at least one filter unit comprises an even number of filter units.

15. The booth of claim 1, wherein further filters for closing or throttling air flow exiting the filter modules are present downstream of the filter modules.

16. The booth of claim 1, wherein further controlled gates for closing or throttling air flow exiting the filter modules are present downstream of the filter modules.

17. A paint-spraying booth, comprising:
a paint-spraying chamber;
at least one filter unit; and
an automated system;
wherein paint is sprayed in the paint-spraying chamber,
wherein the paint-spraying chamber is provided with air flow for evacuation of paint overspray which is conveyed to the at least one filter unit of the paint-spraying booth for filtering and separating the paint overspray from the air flow,
wherein the at least one filter unit comprises a plurality of replaceable filter modules,
wherein each of the filter modules is removably contained inside one of a plurality of housings of the at least one filter unit,
wherein the automated system is configured to remove and transport each of the filter modules between the one of the plurality of housings of the at least one filter unit and a zone for entry/exit of the filter modules into/from the paint-spraying booth,
wherein the automated system comprises:
a motorized shuttle;
at least one transfer module device; and
a rail system extending along the plurality of housings;
wherein the motorized shuttle is configured to move on the rail system along the plurality of housings,
wherein the at least one transfer module device is configured to move between the motorized shuttle, in front of the one of the plurality of housings, and the one of the plurality of housings, and
wherein the at least one transfer module device, the motorized shuttle, and/or the at least one transfer module device and the motorized shuttle are configured to support a first filter module of the filter modules hung from the at least one transfer module device in order to controllably load/unload the first filter module into/from the one of the plurality of housings and to move the first filter module from/to the zone for entry/exit of the filter modules.

18. A paint-spraying booth, comprising:
a paint-spraying chamber;
at least one filter unit; and
an automated system;
wherein paint is sprayed in the paint-spraying chamber,
wherein the paint-spraying chamber is provided with air flow for evacuation of paint overspray which is conveyed to the at least one filter unit of the paint-spraying booth for filtering and separating the paint overspray from the air flow,
wherein the at least one filter unit comprises a plurality of replaceable filter modules,
wherein each of the filter modules is removably contained inside one of a plurality of housings of the at least one filter unit,
wherein the automated system is configured to remove and transport each of the filter modules between the one of the plurality of housings of the at least one filter unit and a zone for entry/exit of the filter modules into/from the paint-spraying booth,
wherein the automated system comprises:
a motorized shuttle;
at least one transfer module device; and
a rail system extending along the plurality of housings;
wherein the motorized shuttle is configured to move on the rail system along the plurality of housings,
wherein the at least one transfer module device is configured to move between the motorized shuttle, in front of the one of the plurality of housings, and the one of the plurality of housings, and
wherein the at least one transfer module device is configured to support a first filter module of the filter modules hung from the at least one transfer module device in order to controllably load/unload the first filter module into/from the one of the plurality of housings and to move the first filter module from/to the zone for entry/exit of the filter modules.

* * * * *